(12) United States Patent
Kumar et al.

(10) Patent No.: US 11,343,273 B2
(45) Date of Patent: May 24, 2022

(54) METHOD OF REDUCING DOS ATTACKS USING VOICE RESPONSE IN IOT SYSTEMS

(71) Applicant: AMRITA VISHWA VIDYAPEETHAM, Kollam (IN)

(72) Inventors: Sangeeth Kumar, Kollam (IN); Venkat P. Rangan, Coimbatore (IN); Maneesha Vinodini Ramesh, Kollam (IN)

(73) Assignee: Amrita Vishwa Vidyapeetham

( * ) Notice: Subject to any disclaimer, the term of this patent is extended or adjusted under 35 U.S.C. 154(b) by 211 days.

(21) Appl. No.: 16/924,468

(22) Filed: Jul. 9, 2020

(65) Prior Publication Data

US 2021/0297445 A1 Sep. 23, 2021

(51) Int. Cl.
*H04L 29/06* (2006.01)

(52) U.S. Cl.
CPC ...... *H04L 63/1458* (2013.01); *H04L 63/0236* (2013.01); *H04L 63/1416* (2013.01);
(Continued)

(58) Field of Classification Search
CPC ............ H04L 63/1458; H04L 63/0236; H04L 63/1416; H04L 63/1425; H04L 63/166;
(Continued)

(56) References Cited

U.S. PATENT DOCUMENTS 7,058,974 B1 6/2006 Maher, III et al.
7,257,641 B1 * 8/2007 VanBuskirk ........... H04N 7/152
709/231
(Continued)

FOREIGN PATENT DOCUMENTS

CN 101110737 A * 1/2008
WO WO-2021028931 A * 2/2021

OTHER PUBLICATIONS

Chifor B.C., et al., "Mitigating DoS Attacks in Publish-subscribe IoT Networks," 9th International Conference on Electronics, Computers and Artificial Intelligence (ECAI), 2017, 6 pages.
(Continued)

*Primary Examiner* — John B King
(74) *Attorney, Agent, or Firm* — Donald R. Boys; Central Coast Patent Agency LLC

(57) ABSTRACT

The invention discloses a method of reducing Denial of Service (DoS) attack in an Internet of Things (IoT) system. The method provides real time communication between a sender node and receiver node by multiplexing control channel (that uses voice traffic) and data channel (that uses internet protocol traffic). Further an IoT system is disclosed. The communication channel between the sender node and the receiver node is configured to divide into a control channel to perform a handshake to the receiver node and data channel to carry data. Also to prevent DoS attack ports are changed periodically using the control channel. The advantages include reduced DoS attack in the network, low memory footprint of less than 2 KB and the communication is real time. The system and method may be used in commercial IoT deployments like environmental monitoring, smart grid, smart cities and health care.

11 Claims, 6 Drawing Sheets

(52) U.S. Cl.
CPC ........ *H04L 63/1425* (2013.01); *H04L 63/166* (2013.01); *H04L 63/20* (2013.01)

(58) Field of Classification Search
CPC ...... H04L 63/20; H04W 4/70; H04W 12/009; H04W 12/122
See application file for complete search history.

(56) References Cited

U.S. PATENT DOCUMENTS

| | | | | |
|---|---|---|---|---|
| 7,340,259 | B2* | 3/2008 | Maloney | G01S 5/12 |
| | | | | 455/515 |
| 8,793,780 | B2 | 7/2014 | Suffling | |
| 9,398,035 | B2 | 7/2016 | Vasseur et al. | |
| 10,116,671 | B1 | 10/2018 | Chen et al. | |
| 10,916,351 | B1* | 2/2021 | Oh | H04L 63/1425 |
| 2003/0014665 | A1* | 1/2003 | Anderson | H04L 63/1458 |
| | | | | 726/4 |
| 2012/0264473 | A1* | 10/2012 | Mujtaba | H04W 68/00 |
| | | | | 455/515 |
| 2017/0245124 | A1* | 8/2017 | Child | H04W 4/021 |
| 2017/0310601 | A1* | 10/2017 | Yu | H04L 69/161 |
| 2018/0054458 | A1 | 2/2018 | Marck et al. | |
| 2018/0115580 | A1* | 4/2018 | Nenov | H04L 63/1458 |
| 2018/0159894 | A1 | 6/2018 | Reddy et al. | |
| 2018/0183832 | A1* | 6/2018 | Chang | H04L 69/08 |
| 2018/0219879 | A1* | 8/2018 | Pierce | H04L 63/1416 |
| 2018/0359811 | A1* | 12/2018 | Verzun | H04W 88/16 |
| 2019/0246463 | A1* | 8/2019 | Williams | H05B 45/24 |
| 2019/0268370 | A1 | 8/2019 | Ogrinz et al. | |
| 2020/0007575 | A1* | 1/2020 | Meriot | H04L 63/145 |
| 2020/0267178 | A1* | 8/2020 | Maor | H04L 63/1425 |
| 2021/0029149 | A1* | 1/2021 | Harada | H04W 4/70 |

OTHER PUBLICATIONS

Dizdarevic J., et al., "A Survey of Communication Protocols for Internet of Things and Related Challenges of Fog and Cloud Computing Integration," ACM Computing Surveys, Jan. 2019, vol. 51 (6), 29 pages.

* cited by examiner

METHOD OF REDUCING DOS ATTACKS USING VOICE RESPONSE IN IOT SYSTEMS

CROSS-REFERENCES TO RELATED APPLICATIONS

This application takes priority to Indian patent application no. 202041012225 filed on Mar. 20, 2020 entitled METHOD OF REDUCING DoS ATTACKS USING VOICE RESPONSE IN IoT SYSTEMS.

FIELD OF THE INVENTION

The invention generally relates to Denial of Service (DoS) attacks in Internet of Things (IoT) systems and in particular to a method of reducing DoS attacks in IoT systems.

DESCRIPTION OF RELATED ART

In ultra-resource constrained Internet of Things (IoT) network, handling denial of service (DoS) attack is a major challenge. The devices become much more vulnerable, when they are installed as standalone node in remote outdoor environment and exposed to public internet. Neither they are behind a firewall nor are they able to run resource rich security algorithms.

IoT nodes are deployed widely in larger area for sensing and actuation with network connection. For larger and remote outdoor installations, the nodes are capable of running in harvested energy from renewable energy sources like solar and wind. Drawing electricity lines to each of the nodes is impossible. The power consumption of the node is directly proportional to the hardware connected to the node. Small nodes with ultra-low power resources can use the harvested energy for longer time. Each of these nodes is connected to the internet and collaboratively communicates to take intelligent decisions for a task. To collaboratively communicate, device to device communication should be possible. To achieve this, the receiver listens on network tcp/udp port and sender sends the data to the receiver's port. These network ports are prone to DoS attacks when the receivers listen on the network. Since the receivers are listening on a port without any firewall, the botnets in world wide web uses syn flood attack or udp flood attack etc. to compromise the node. The TCP/IP stack in the node become non-responsive due to this attack and manual troubleshooting is required. There is ongoing research on machine learning algorithms that find anomaly packets in the node. But computationally costly algorithms are not possible for the ultra-low resource node with 2 KB RAM as shown in FIG. 1

The US patent US20190268370A1 provides a method for preventing an IoT device within a trusted system from being harnessed in a malicious DDOS attack. U.S. Pat. No. 9,398,035B2 relates to attack mitigation using machine learning. U.S. Ser. No. 10/116,671B1 provides a system and computer program product for detecting distributed DDoS attacks. US2018159894A1 techniques for mitigating a distributed denial of service attack. The US patent U.S. Pat. No. 7,058,974B1 discloses a method and apparatus for preventing denial of service type attacks on data networks. The patent application US20180054458A1 relates to a data network for providing protection against directed denial of service (DDoS) attacks. U.S. Pat. No. 8,793,780B2 describes a system and method that are implementable using an authenticating device, for authenticating requesting devices over a network. "A Survey of Communication Protocols for Internet of Things and Related Challenges of Fog and Cloud Computing Integration", Jasenka et al (2019), ACM Computing Surveys, conducts surveys on the application layer communication protocols to fulfill the IoT communication requirements, and their potential for implementation in fog- and cloud-based IoT systems. Disclosed herein are systems and methods that may reduce DoS attacks between nodes in an IoT system.

SUMMARY OF THE INVENTION

The invention in various embodiments discloses a method of sending data from a sender node to one or more receiver nodes in a network. The method includes fetching real time data from one or more sensors connected in one or more nodes in the network. A TCP/UDP packet configured to be sent from a sender node to one or more receiver nodes in the network through communication channels is constructed. The TCP/UDP packet includes one or more of sampled real time data from the one or more sensors, timestamp of sampling the data from the one or more sensors, signal strength of a cell or power in the sender node. The communication channel between the sender node and the one or more receiver nodes is divided into a control channel component and data channel component based on the data from the one or more sensors satisfying a predetermined condition. The receiver nodes are signaled by the sender node through the control channel for establishing a handshake. In various embodiments the TCP/UDP packet are send to the one or more receiver nodes through the data channel.

In various embodiments the control channel uses voice traffic to signal the receiver nodes. In various embodiments signaling includes sending encoded node configuration parameters having a nonce, choice of acknowledgement based or non-acknowledgment-based communication, or expected duration of communication in the data channel.

In various embodiments the nonce is generated from the timestamp, an International Mobile Subscriber Identity (IMSI) number and an IP address of the sender node. In various embodiments the predetermined condition is that of the sensor response exceeding a threshold value.

In various embodiments the node configuration parameters are encoded using Dual Tone Multifrequency (DTMF) commands. In various embodiments the signaling is acknowledgement based for critical data.

In various embodiments an internet of thing (IoT) system is disclosed. The IoT system includes a plurality of nodes, one or more IoT devices, a controller, a GSM modem, communication channels and one or more ports. Each node is configured to be a sender node to send data to one or more other nodes and a receiver node to receive data from the sender node. In various embodiments each node includes one or more IoT devices configured to measure data from the neighborhood, a controller configured to receive data from the IoT devices and construct a TCP packet to be sent from the sender node to the one or more receiver nodes in the network and a GSM modem configured to receive control signals from the microcontroller. The communication channels are configured to connect the plurality of nodes and form a network and carry data from the sender nodes to the one or more receiver nodes. In various embodiments the communication channel is configured to be divided into a control channel to send a request to the receiver node and a data channel to send the TCP/UDP packet to the receiver node by the GSM modem, if the data from the one or more IoT devices are above a threshold. The one or more ports are configured to connect the plurality of nodes to the internet.

In various embodiments the control channel is configured to dynamically change the ports during communication between the sender node and the one or more receiver nodes. In various embodiments the TCP/UDP packet includes one or more of sampled real time data from the one or more IoT devices, timestamp of sampling the data from the one or more IoT devices, signal strength of a cell or power in the sender node. In various embodiments the control channel uses voice traffic to send a request to the receiver nodes.

In various embodiments sending a request to the receiver nodes includes sending encoded node configuration parameters comprising a nonce, choice of acknowledgement based or non-acknowledgment-based communication or, expected duration of communication in the data channel. In various embodiments the nonce is generated from the timestamp, an International Mobile Subscriber Identity (IMSI) number and an IP address of the sender node. In various embodiments the node configuration parameters are encoded using Dual Tone Multifrequency (DTMF) commands. In various embodiments the signaling is acknowledgement based for critical data.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

Figure 1:
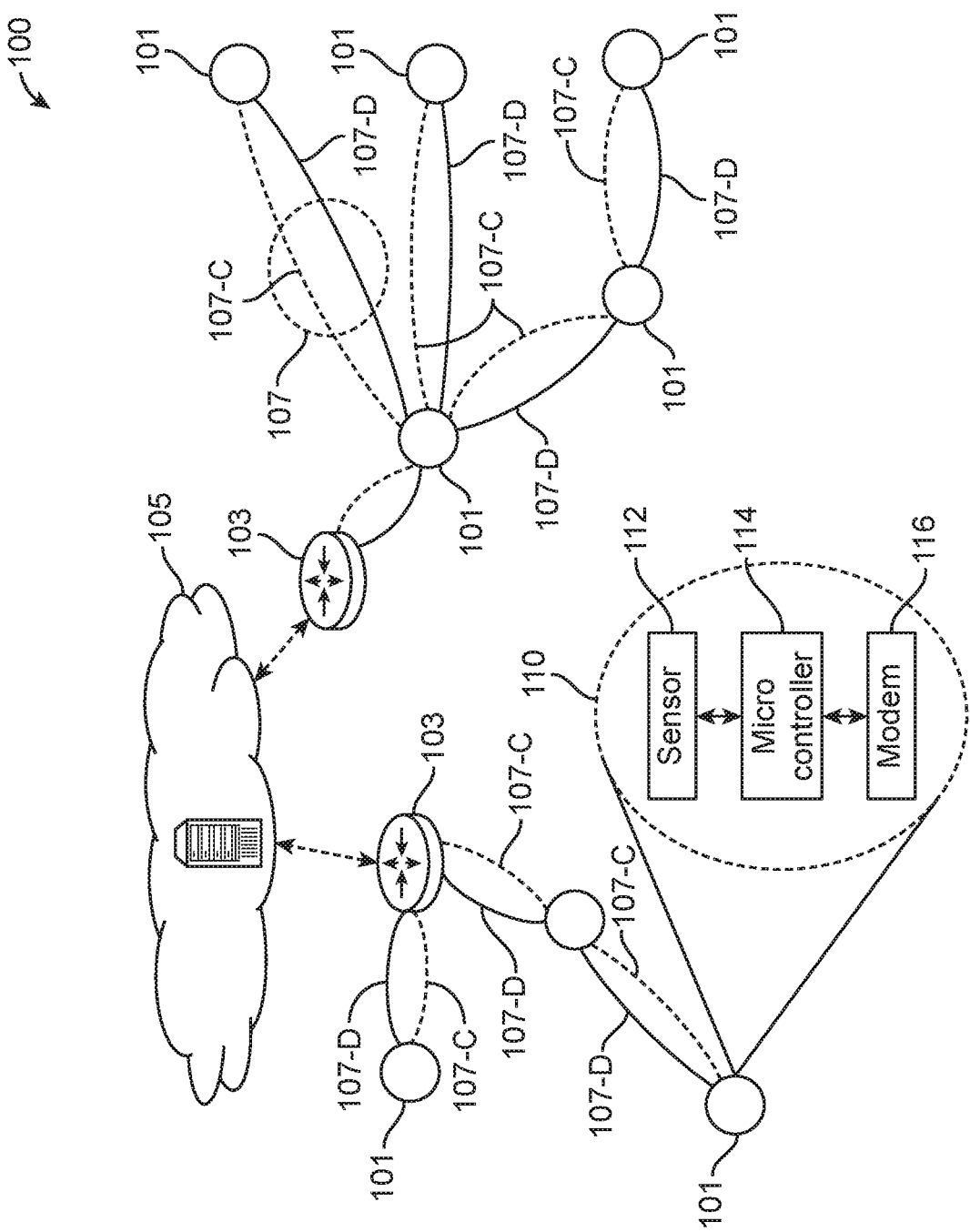
FIG. 1 illustrates the IoT system diagram having nodes, ports and a cloud server.

While the invention has been disclosed with reference to certain embodiments, it will be understood by those skilled in the art, that various changes may be made and equivalents may be substituted without departing from the scope of the invention. In addition, many modifications may be made, to adapt to a particular situation or material to the teachings of the invention, without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The invention in its various embodiments discloses a method of reducing Denial of Service (DoS) attack in an Internet of Things (IoT) system. The method provides real time communication between a sender node and receiver node by multiplexing control and data channel. Further an IoT system is disclosed. The communication channel between a sender node and a receiver node in the system is configured to be divided into a control channel and a data channel. The control channel is configured to provide a request for a handshake from the sender node to the receiver node and data channel is configured to carry data from the sender node to the receiver node. Also to prevent DoS attack, ports are changed periodically using the control channel.

In various embodiments, an IoT system 100 as shown in FIG. 1 is disclosed. The system includes a plurality of nodes 101 that are connected through telecommunication networks and configured to communicate with each other. Each of the nodes 101 has one or more TOT devices 110 having sensors 112, microcontroller 114, tiny embedded Global System for Mobile Communications (GSM) modem 116 and one or more sensors 112. The signals from the sensors 112 are received by the microcontroller 114 through an Analog to Digital convertor (ADC). The microcontroller 114 is connected to the embedded GSM modem 116 through Universal Asynchronous Receiver/Transmitter (UART) interface. The nodes 101 connect directly to the telecommunication network using embedded GSM modem 116. The nodes 101 may directly communicate between themselves using an International Mobile Subscriber Identity (IMSI) number assigned to each node. The nodes 101 may also communicate to the cloud server 105 placed behind the firewall in a data center. The nodes 101 are connected to a cloud server 105 through ports 103. The ports 103 may be an access point, router OR a switch. Each node 101 may perform the task of sending data to one or more receiver nodes as well as may function as a receiver node that receives data from the sender nodes.

In various embodiments during communication between two nodes the controller 114 in the sender node is configured to construct a TCP/UDP packet to be sent from the sender node to the receiver nodes in the network. The controller 114 may also receive packets from the sender nodes and generate acknowledgements for the received data. In various embodiments the nodes 101 communicate through communication channels 107 that form a network and carry data from the sender nodes to the one or more receiver nodes. In various embodiments when a sender node 101 tries to establish a handshake with one or more receiver nodes 101 the communication channels 107 between the sender node 101 and the one or more receiver nodes 101 is configured to be divided into a control channel 107-C and a data channel 107-D under predetermined conditions. A request from the sender node to the receiver node 101 for establishing a handshake is send via the control channel 107-C. In various embodiments when a handshake is accepted by the receiver nodes for communication with the sender node data packets including TCP/UDP packets are sent to the receiver nodes via the data channel. In various embodiments the GSM modem 116 is configured to multiplex and demultiplex the control channel and data channel, by default. The modem 116 is controlled and configured by commands from the microcontroller 114 connected to it through UART interface. In various embodiments the communication channel 107 is divided into a control channel 107-C and a data channel 107-D when the data from the one or more IoT devices 110 are above a threshold.

In IoT networks the receiver node listens on the network's TCP/UDP port when the sender node sends the data to the receiver's node. Hence an attacker may initiate DoS attack in the network when the receiver node listens on the network. In various embodiments, when the request for mutual communication is send from the sender node to the receiver node through the control channel, the communication channel between the sender and receiver node may seems to have some traffic for an attacker or any other third node. Hence the attacker or any other third node may not initiate communication with the receiver node or flood the receiver node with data thus preventing a DoS attack.

In various embodiments of the system, during communication between the sender node and the one or more receiver nodes, the ports through which the sender and the receiver nodes mutually communicate are changed using the control channel. This helps in reducing the targeted DoS attack on the nodes in the data channel. In various embodiments, the control channel uses voice traffic to send a request to the receiver nodes.

Figure 2A:
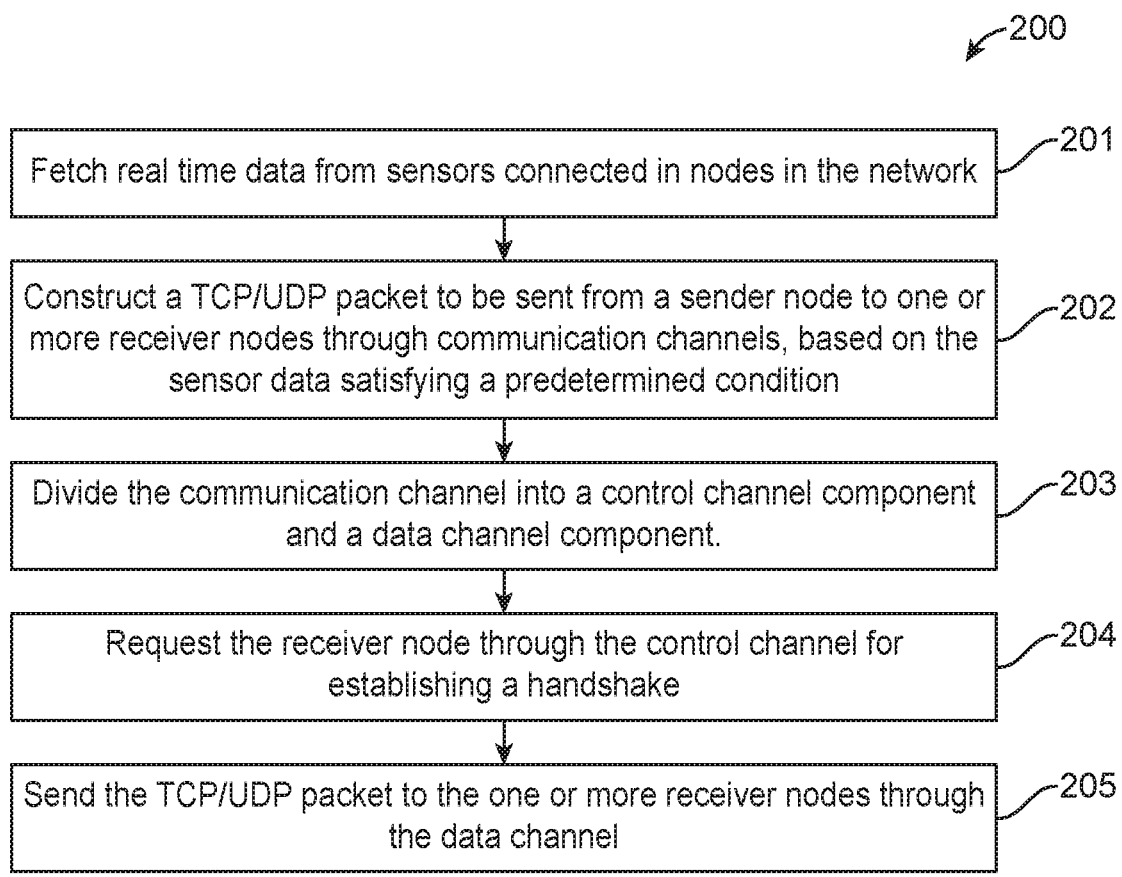
FIG. 2A illustrates the method of reducing denial of service (DoS) attack in a network.

In various embodiments, a method of sending data from a sender node in an IoT system to one or more receiver nodes in the IoT system is disclosed. The method as shown in FIG. 2A includes fetching real time data from the one or more sensors connected in the one or more nodes in the IoT system in step 201. The sensors in the system are IoT devices that may be configured to collect data or perform a function. Each sensor in the system is initialized in the application layer and the data obtained are sampled to get the real time data from each sensor or IoT device. In various embodiments a set of processing routines check if the data from the sensor has crossed a predetermined threshold value defined in the nodes. In various embodiments in step 202 when the sensor data is above the predetermined threshold value a TCP/UDP packet containing sampled real time data from the one or more sensors, timestamp of sampling the data from the one or more sensors, signal strength of the cell or power in the sender node is constructed. The packet is configured to be sent from a sender node to one or more receiver nodes in the network if the data from the sensor has crossed a predetermined threshold value. The packet is send through communication channels that connect the sender node and the receiver node. In various embodiments in step 203 the communication channel connecting the sender node and the receiver nodes is configured to be split into a control channel component and data channel component for the nodes to communicate with each other.

In one embodiment, in step 204 the control channel is used to signal the receiver nodes by the sender node for establishing a handshake. In various aspects of the disclosure establishing a handshake means initiating mutual communication between two nodes connected in the network. In another embodiment in step 205 TCP/UDP packet from the sender node is send to the one or more receiver nodes through the data channel. In various embodiments when the request for mutual communication between a sender node and a receiver node is sent through the control channel, an attacker or any other third node may not be able to initiate communication with the receiver node or flood the receiver node with data in the control channel. The attacker or any third node may receive a signal indicating that the communication channel is in use.

Figure 2B:
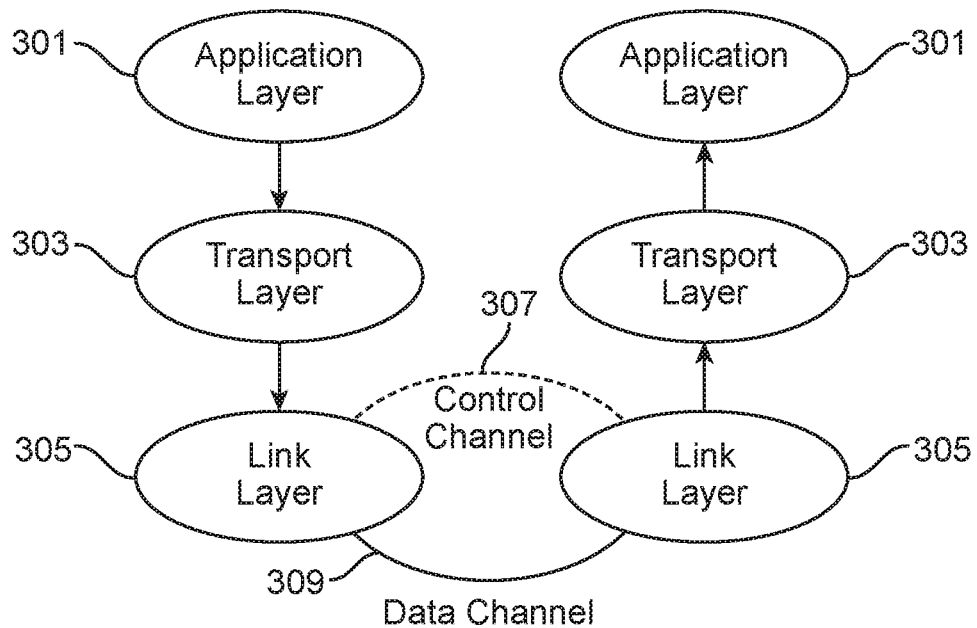
FIG. 2B shows the data flow in the application layer and the communication channel.

In various embodiments, as shown in FIG. 2B the data from the sensors are obtained and send from the sender node to the receiver node in the application layer 301. The transport layer is configured to transmit data segments between points on a network reliably. The communication channel between the sender node and receiver node is divided into a control channel 307 and data channel 309. This happens in the link layer 305. A request from the sender node to the receiver node to establish a handshake for mutual communication is sent via the control channel 307. The data channel 309 carries data between the sender node and receiver node.

In various embodiments, the control channel 307 uses the voice traffic to communicate with the one or more receiver nodes to signal its interest for establishing a handshake. In various embodiments the sender node sends encoded node configuration parameters to the receiver node. The parameters may include a nonce, choice of whether the communication is acknowledgement based or non-acknowledgment-based, expected duration of communication in the data channel. The expected duration of communication may enable a port to be kept open for that particular duration.

In various embodiments, the nonce is generated from the hash that has the timestamp, an IMSI number and the IP address of the sender node. In an open public network, the botnets scan different IP addresses for checking vulnerabilities in a node to gain unauthorized access. In some embodiments the method reduces the traditional botnet attacks by using the IMSI number for establishing the communication with the receiver node through the control channel.

Figure 2C:
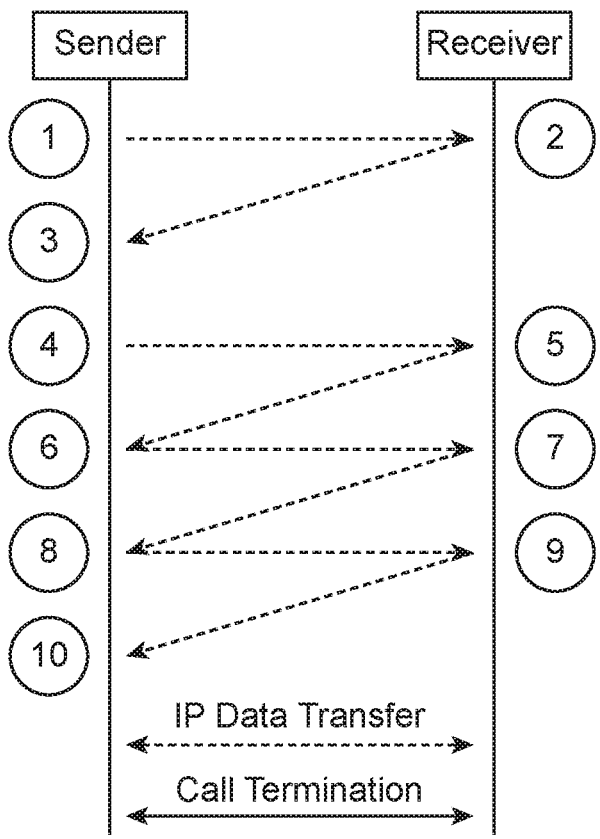
FIG. 2C illustrates the handshake protocol between the sender node and receiver node.

In various embodiments, the data channel 309 is configured to send data between the sender node and the receiver node through IP channel. The communication between the nodes is initiated with a signal from the sender node to the receiver node through the control channel 307. The communication between the sender and the receiver nodes are as shown in FIG. 2C. In various embodiments in step 1 the sender node sends a signal requesting for handshake with the receiver node through the control channel. In step 2 the receiver node receives the signal and verifies the IMSI number of the sender node in the receiver node's directory that is a flash memory. If the IMSI number is not found, call is terminated. If the IMSI number is valid, the receiver node sends an acknowledgement to the sender node. In various embodiments in step 3 the acknowledgement from the receiver node is received by the sender node. If the sender node does not receive an acknowledgement from the receiver node, then the sender node may resend a request for a handshake with the receiver node after a predefined time. In various embodiments in step 4, when the acknowledgment from the receiver node is received the sender node is configured to connect to the internet data connection through a port. A frame containing the IP address of the sender node and unique nonce is sent to the receiver node. The nonce is generated by the timestamp, IMSI number and the four MSB hexadecimal values of the IP address of the sender node.

In various embodiments, in step 5 the receiver node receives the frame and establishes a data connection with the cellular network and may send an acknowledgement containing the IP address of the receiver node to the sender node. The IP address uses a simple XoR mechanism using nonce with CRC-32 check. In various embodiments in step 6 the sender node may receive the frame containing the IP address of the receiver node and sends a frame with data including the payload size, port number that has to be open and duration of the port to be open. In step 7 the receiver node receives the frame and checks if the port number may be used and send an acknowledgement frame if the port number may be used or may send a preferred port number tagged with the acknowledgment frame. In step 8, the sender node receives the frame and sends if the communication in the data channel needs to be acknowledgement based or non-acknowledgement-based. For critical data, acknowledgement-based communication is used. A critical data in a system is defined as data value exceeding a set threshold value. For example in a system with sensors having moisture sensor, pore pressure sensor, movement sensor etc. rainfall may trigger all the sensor values to high. A threshold value is set for each sensor. If the sensor value in ADC increases above the threshold value, the nodes start to disseminate the data among themselves. A little increase in moisture sensor, may be considered non-critical. A sudden cloud burst of rain, causing steep increase in pore pressure sensor value of hill, is considered critical. In various embodiments in step 9, the receiver node acknowledges the received data with preferred type of communication. In various embodiments, during the period of communication, the ports are changed periodically using the control channel and step 4 to step 9 are performed repeatedly at predetermined durations. This may help prevent any targeted DoS attack on the receiver port. In various embodiments in step 10 the call is terminated in control and data channels when the communication between the sender and receiver nodes comes to an end.

In various embodiments, the node configuration parameters are encoded using Dual Tone Multifrequency (DTMF) commands. DTMF is the method used for telecommunication signaling between handsets over voice frequency bands. In various embodiments for critical data the signaling is acknowledgement based.

The advantages of the method and system disclosed include reduced DoS attack in the network, low memory footprint of less than 2 KB and the communication is real time. Also, the system has control channel in voice traffic because during disasters or emergency conditions, voice traffic has higher priority than internet data traffic. Based on some needs the receiver port may listen on the network or may be signaled by control channel. The data channel (or data network) in the receiver node may be enabled only after mutual handshake in the control channel. This reduces unnecessary activation of data channel and saves power. The system and method may be used in commercial IoT deployments including environmental monitoring, smart grid, smart cities and health care.

EXAMPLES

Figure 3:
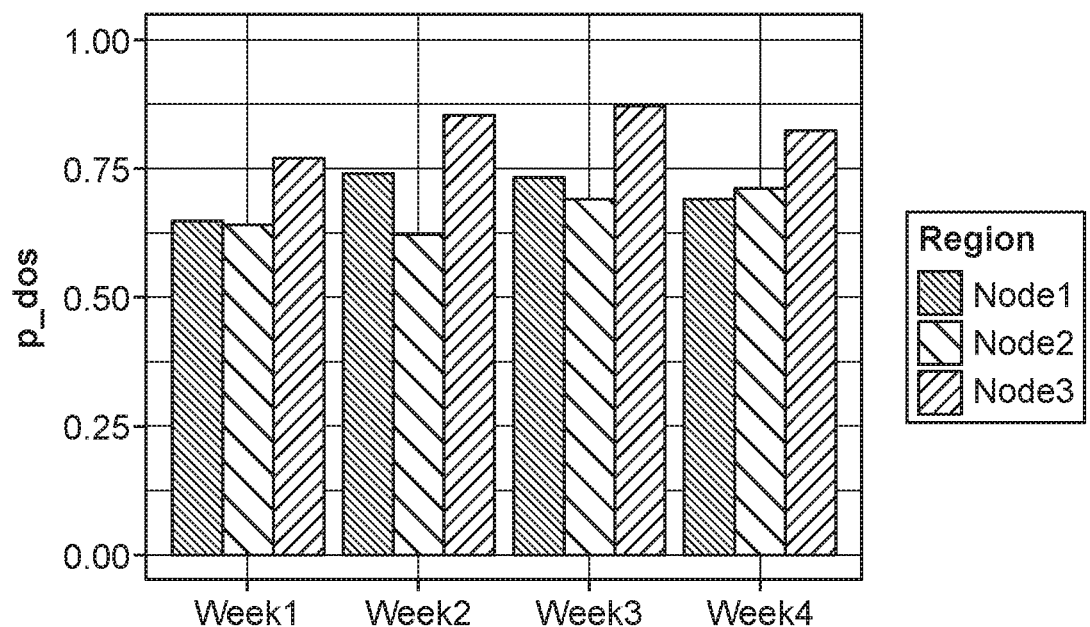
FIG. 3 shows the Dos attack in node 1, node 2 and node 3 under normal conditions.
Figure 4:
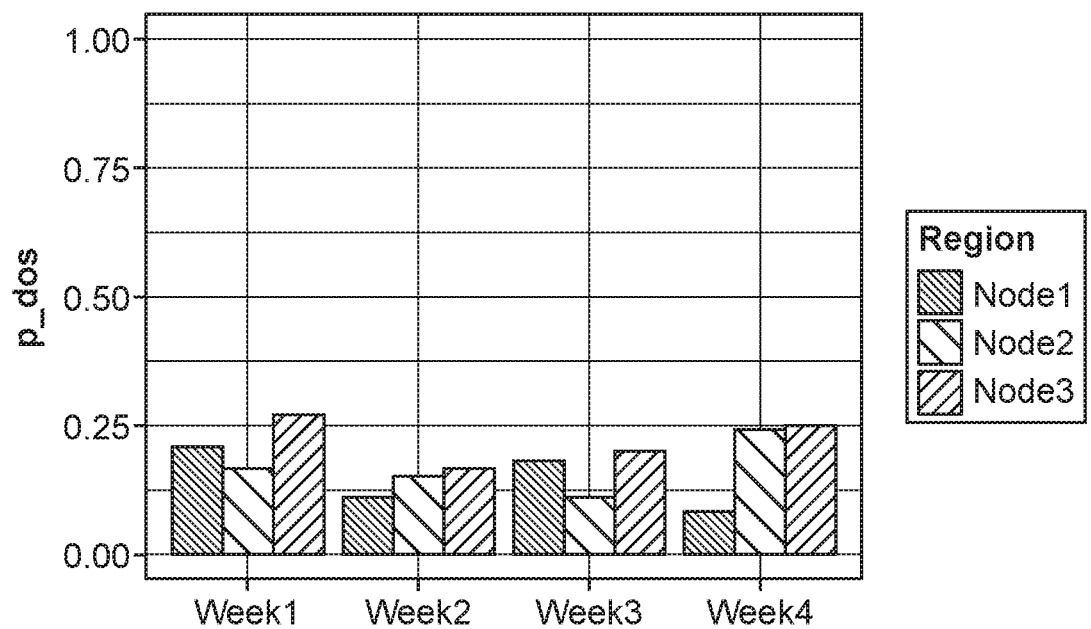
FIG. 4 illustrates the DoS attack scenario in nodes incorporating VRITHI.

Example 1: Comparing the DoS Attack, Power and Real Time Communication Between VRITHI and the Existing Systems "Voice Response Internet of Things" or "VRITHI system was set up. Initially, the node with traditional communication mechanism was setup and the DoS attacks were observed for a month. The nodes consists mainly of two components—a tiny embedded GSM modem and a microcontroller. The microcontroller used was of Arduino based chipset with RAM of 8 KB and clock speed of 8 Mhz. The GSM modem used was sim 900 and it connected to the microcontroller using a UART interface. The modem was directly connected to the public Internet. The sensor drivers and other processing routines took around 4 KB of the memory, leaving only 4 KB for network routines. Sensors were connected using an external signal conditioning board to the ADC of the microcontroller. Three different nodes were tested for four weeks in different geographical regions. The node was a victim for various Dos attacks like syn flood attack, buffer overflow, udp flood etc. as shown in FIG. 3. It was observed that an average of 65% to 85% of nodes were affected. The IoT system of the invention, VRITHI was test setup in 3 nodes in different areas of the field setup. VRITHI nodes communicated using both voice and data channel. It is observed that the percentage of DoS attack has been reduced to less than 28%, as shown in FIG. 4

To compare the power and real time communication the protocols can be classified as, i) Publish-Subscribe (P/S) and ii) Request-Response(R/R). In the Publish-Subscribe (P/S) protocol the client IoT node sends the message to the message broker in cloud. The message broker broadcasts these messages to the receiver nodes subscribed to the sender. The drawback of this mechanism is that the subscriber must continuously listen for incoming messages at a port number to receive them. The DoS attack mainly takes advantage of the open port to compromise the node.

In the Request-Response(R/R) mechanism, client node sends the message to the message broker in the cloud. The receiver node, instead of listening continuously to the incoming messages, connects to the broker periodically and fetches the messages. This prevents DoS attack. But the drawback of the mechanism is that periodical polling with the broker might result in non-real time communication between the nodes. It also results in more power consumption due to unnecessary polling when messages are not available in broker.

The design VRITHI falls into is a new category called Dual Channel Communication. It overcomes the disadvantages of the above two categories using both voice channel and data channel. Based on the above two categories, the analysis of predominantly used IoT protocols are tabulated below in Table. 1.

TABLE 1

Analysis of Predominantly Used IoT Protocols and VRITHI

| Protocol | Type | Code | Realtime | Vulnerability Level | Power Consumption |
| --- | --- | --- | --- | --- | --- |
| MQTT | P/S | Light Weight | Yes | High | High (Continuous listening) |
| AMQP | R/R | Light Weight | No | Low | Moderate (Continuous Polling) |
| CoAP | R/R | Heavy Weight | No | Low | Moderate (Continuous Polling) |
| XMPP | R/R | Heavy Weight | No | Low | Moderate (Continuous Polling) |
| VRITHI | Dual Channel | Light Weight | Yes | Low | Low (Interrupt based) |

Figure 5A:
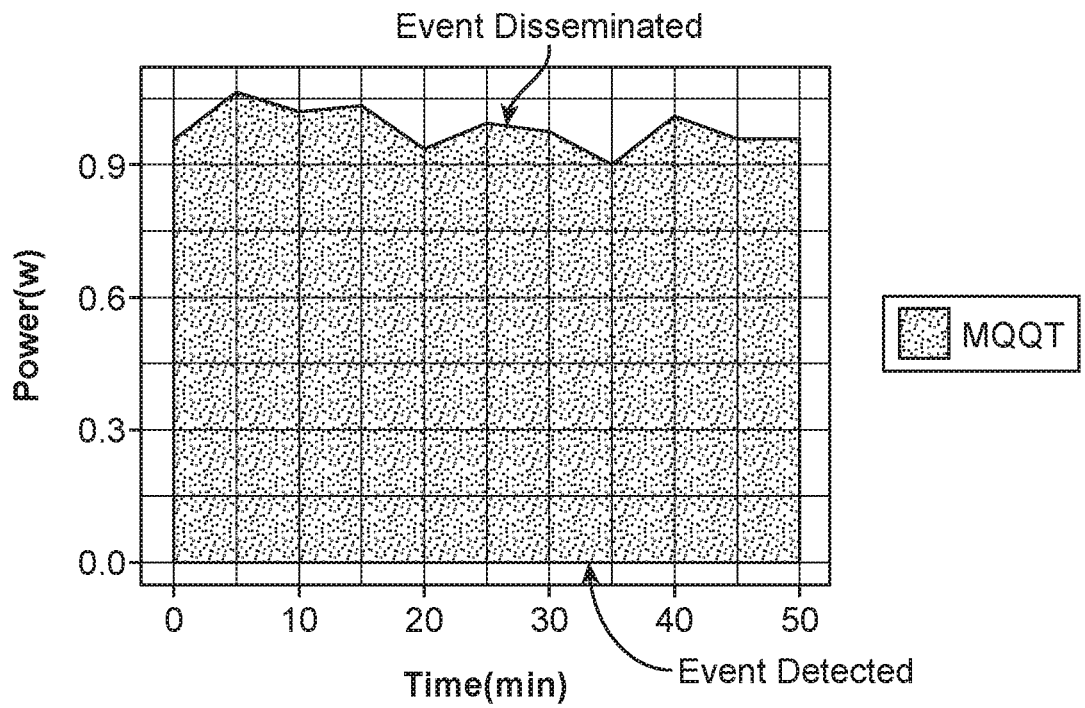
FIG. 5A illustrates event trigger and detection of real time communication in MQTT protocol.
Figure 5B:
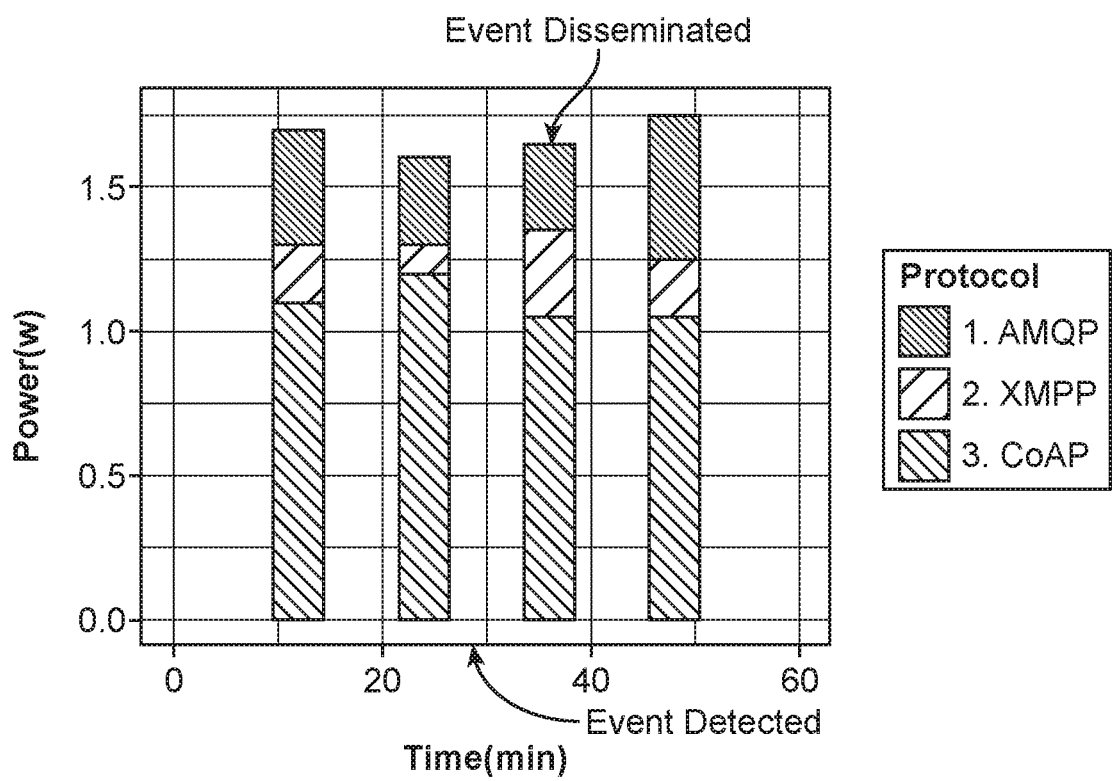
FIG. 5B illustrates event trigger and detection of real time communication in AMQP, CoAP and XMPP protocols
Figure 6:
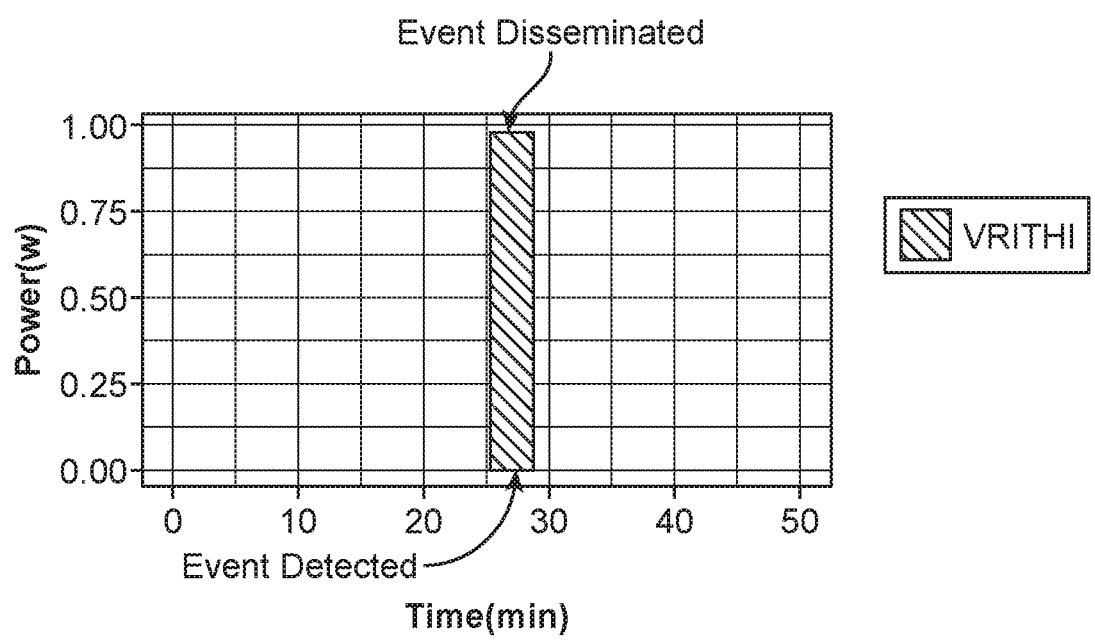
FIG. 6 illustrates the event trigger and detection of real time communication in VRITHI.

As shown in the Table. 1 MQTT is not suitable because of its continuous listening of packets to the subscriber. This makes the node more vulnerable for botnet attacks and increases the power consumption as shown in FIG. 5A The other protocols AMQP, CoAP, XMPP are not continuously listening but are polling based. Due to this it causes non real time communications as shown in FIG. 5B. As shown in FIG. 6, event is detected at 28th minute, whereas event is disseminated to other nodes only at 36th minute in the Request/Response Architecture. VRITHI, neither listens continuously for incoming packets nor does polling to the broker. It is interrupt-based. This helps to overcome the above two problems and provide communication with reduced DoS attack and lesser power consumption.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent, to those skilled in the art, may be made in the arrangement, operation and details of the system and method of the present invention disclosed herein without departing from the spirit and scope of the invention as described here. While the invention has been disclosed with reference to certain embodiments, it will be understood by those skilled in the art, that various changes may be made and equivalents may be substituted, without departing from the scope of the invention. In addition, many modifications may be made to adapt to a particular situation or material the teachings of the invention without departing from its scope.

What is claimed is:

1. A method of sending data from a sender node to one or more receiver nodes in a network comprising:
   fetching real time data from one or more sensors connected in one or more nodes in the network;
   constructing a TCP/UDP packet configured to be sent from the sender node to the one or more receiver nodes in the network through communication channels, wherein the TCP/UDP packet comprises one or more of sampled real time data from the one or more sensors, timestamp of sampling the data from the one or more sensors, signal strength of a cell or power in the sender node;
   dividing the communication channel between the sender node and the one or more receiver nodes into a control channel component and data channel component thereof, based on the data from the one or more sensors satisfying a predetermined condition;
   signaling the receiver nodes by the sender node through the control channel for establishing a handshake, wherein the control channel uses voice traffic to signal the receiver nodes to dynamically change ports to prevent a denial of service attack; and
   sending the TCP/UDP packet to the one or more receiver nodes through the data channel.

2. The method of claim 1, wherein the signaling comprises sending encoded node configuration parameters comprising a nonce, choice of acknowledgement based or non-acknowledgment-based communication, or expected duration of communication in the data channel.

3. The method of claim 2, wherein the nonce is generated from the timestamp, an International Mobile Subscriber Identity (IMSI) number and an IP address of the sender node.

4. The method of claim 2, wherein the node configuration parameters are encoded using Dual Tone Multifrequency (DTMF) commands.

5. The method of claim 2, wherein the signaling is acknowledgement based for critical data.

6. The method of claim 1, wherein the predetermined condition is that the data from the sensors exceed a threshold value.

7. An internet of thing (loT) system comprising:
   a plurality of nodes, each node configured to be a sender node to send data to one or more other nodes and a receiver node to receive data from the sender node, wherein each node comprises:
      one or more loT devices, each incorporating a sensors configured to measure data;
      a microcontroller configured to receive data from the sensors and construct a TCP/UDP packet to be sent from the sender node to the one or more receiver nodes; and
      a GSM modem configured to receive control signals from the microcontroller;
   communication channels configured to connect the plurality of nodes and form a network and carry data from the sender nodes to the receiver nodes,
   wherein the communication channels are configured to be divided into control channels to send a request to the receiver nodes and data channels to send the TCP/UDP packet to the receiver nodes by the GSM modem, when the data from the sensors are above a threshold; and
      one or more ports configured to connect the plurality of nodes to the internet, wherein the control channels are configured to use voice traffic to signal the receiver nodes to dynamically change the ports to prevent a denial of service attack.

8. The system of claim 7, wherein the TCP/UDP packet comprises one or more of: sampled real time data from the sensors, timestamp of sampling the data from the sensors, signal strength of a cell or power in the sender node.

9. The system of claim 7, wherein sending the request to the receiver nodes comprises sending encoded node configuration parameters comprising a nonce, choice of acknowledgement based or non-acknowledgment-based communication or, expected duration of communication in the data channel.

10. The system of claim 9, wherein the node configuration parameters are encoded using Dual Tone Multifrequency (DTMF) commands.

11. The system of claim 9, wherein the signaling is acknowledgement based for critical data.

* * * * *